No. 690,793. Patented Jan. 7, 1902.
D. L. TAYLOR.
COMBINED REQUEST AND MAILING SHEET.
(Application filed Mar. 15, 1900.)
(No Model.)
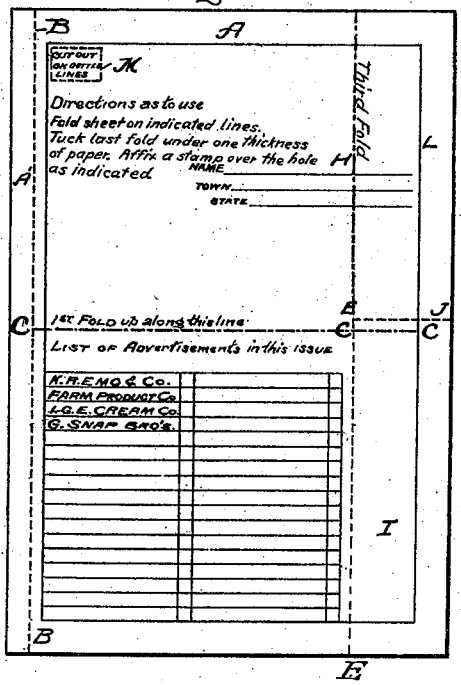
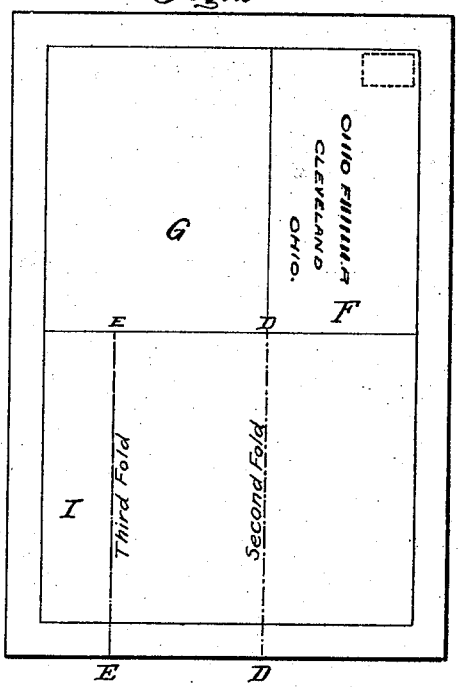
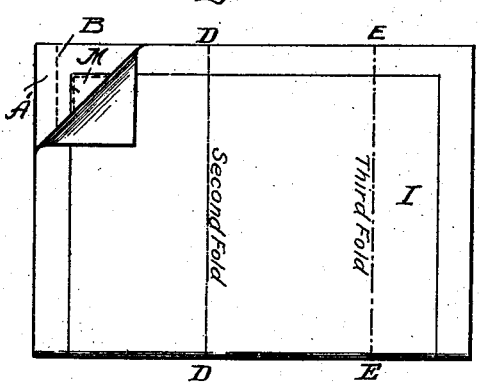
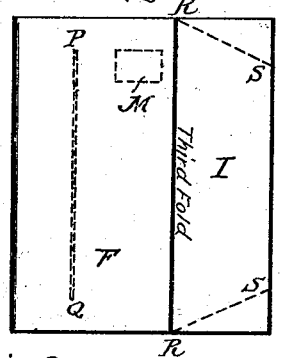
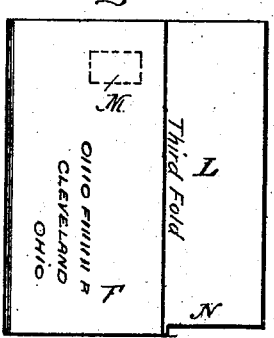
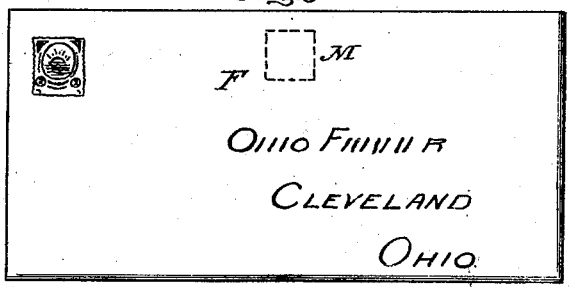
Witnesses
Edmund A. Strause
Addie C. Emmons
Inventor
David L. Taylor
by Wm. O. Belt, Atty.
THE NORRIS PETERS CO., PHOTO-LITHO., WASHINGTON, D. C.

UNITED STATES PATENT OFFICE.

DAVID L. TAYLOR, OF CHICAGO, ILLINOIS.

COMBINED REQUEST AND MAILING SHEET.

SPECIFICATION forming part of Letters Patent No. 690,793, dated January 7, 1902.

Application filed March 15, 1900. Serial No. 8,761. (No model.)

*To all whom it may concern:*

Be it known that I, DAVID L. TAYLOR, a citizen of the United States of America, and a resident of Chicago, in the county of Cook and State of Illinois, have invented certain new and useful Improvements in a Combined Request and Mailing Sheet, of which the following is a specification.

My invention relates to a combined request and mailing sheet, and particularly to a sheet bearing printed information which is bound in with a periodical and adapted to be removed therefrom and folded for transmission through the mails in the form of an envelop.

At the present time various means are employed by advertisers for checking up their advertisements and crediting particular periodicals in accordance with the number of inquiries and business received and traceable thereto. For example, many advertisers include a request that the correspondent will mention the name of the magazine in which the advertisement that attracted his attention appeared; but correspondents frequently neglect to do this, and unless some additional checks are employed it is impossible to determine from what source the correspondent secured the information which led him to communicate with the advertiser. In addition to this it is a well-known fact that the benefit of some advertising is lost because those persons who are really attracted by and interested in the advertisements and the business to which they relate will not take the time and trouble to open correspondence with each particular advertiser.

The object of my invention, therefore, is to provide an easy way for those who are or may, perhaps, become interested to secure circulars, price-lists, &c., and open correspondence with a number of advertisers without necessitating a direct and personal communication to each.

A further object of the invention is to provide a simple and accurate method of checking the returns received from advertisements, so that the proper credit, as shown by responses and business, may be given to the source from which the information resulting in the inquiry was derived; and a further object of the invention is to provide a request-sheet bearing certain information which can be bound up in a periodical and afterward readily removed therefrom and folded in the form of an envelop and sealed so that it can be passed through the mails.

In the accompanying drawings, illustrating my invention, Figure 1 shows one side of the sheet, and Fig. 2 the back thereof. Fig. 3 shows the sheet partly folded, and Fig. 4 shows the sheet folded on the second fold. Fig. 5 shows the sheet folded the second time and with the section I cut out, and Fig. 6 illustrates the sheet completely folded in the form of an envelop and ready for mailing.

Referring to the drawings, in which like letters of reference denote corresponding parts in all figures, A designates the sheet, which may be made out of any material and of any color and shape; but it is preferably made of a color distinguishing it from the other pages of the periodical and of the same size as the pages of the periodical, so that it can be bound in at the section A', preferably at the beginning of the advertising pages, and to all intents and purposes constituting an integral page of the periodical. This sheet is adapted to be removed from the book by tearing the sheet on the line B B, which may be simply indicated by a broken line or by a line of perforations.

The sheet is adapted to be folded three times—first, on the line C C; second, on the line D D, and, third, on the line E E—so as to make it of convenient shape for mailing and corresponding in shape to an envelop.

On the face of the sheet I print a list of all or any number of the advertisers in the periodical, headed by suitable directions as to the purpose for and the manner in which the sheet is to be used, and on this same side, which, it will be observed, is the inside when the sheet is folded for mailing, I prefer to have a section H, in which the inquirer writes his name and address; but this may be done on the section G or elsewhere. On the back of the sheet and in one section F thereof in the upper half of the sheet I print the address of the addressee, so that when the sheet is folded this address will appear uppermost on the front of the mailing-envelop formed by folding the sheet. It is apparent that any address may be employed which will carry the sheet to the proper person and also that this address may be placed in the section G, if desired. It will also be apparent that I may arrange the section H for the name and address of the inquirer in some other position on the face of the sheet and that the list of advertisers may be differently arranged on the face of the sheet and also extended over to the lower half of the back of the sheet, or the inquirer's name and address may be placed on this lower portion of the back of the sheet.

In order to fold the sheet in a convenient and simple manner for mailing and so that it will pass through the mails without being torn or disfigured, I arrange the folds so as to leave a flap at one side, which can be tucked under the section F, Figs. 4 and 5, and I may cut out the section I on the lines J E and E E, Fig. 1, so as to leave the section L in the form of a single flap, Fig. 5, instead of having the double flap constituted by the section I folded on the section L, as shown in Figs. 3 and 4.

As an additional fastening device I may cut out the section, such as M, in some part of the address-section F which will disclose the flap through the address-section when the sheet has been folded as aforesaid, and then I place the mailing-stamp on the address-section directly over the hole left therein by the removal of section M, so that it will adhere both to the address-section around the edges of the hole and also to the flap thereunder. In this way I provide an effectual sealing device for the sheet, which will retain the sheet in its envelop form and which cannot be disturbed without completely mutilating the stamp. If the section I is removed, I prefer to leave the lower edge portion N of the single flap L square, so that when folded as hereinbefore described it will fit closely in the fold on the line C C, and being held therein by the stamp will maintain the sheet in its envelop form at all times.

In order to facilitate the use of this improved request and mailing sheet, I prefer to print thereon proper directions for folding and cutting and may indicate the lines of folds by broken or dotted lines, perforations, or otherwise, with directions adjacent to the line C C to fold up from the bottom on this line first, and directions adjacent to the line D D to fold on this line second, and directions adjacent to the line E E to fold on this line and tuck the flap under the address-section, which would be disclosed through the hole in the address-section, and a direction on the flap beneath the hole for affixing the stamp thereover.

I am aware that various changes may be made in the location and arrangement of the printed matter and that the folding may be accomplished by proceeding in a different manner and also that the sheet may be sealed for mailing by leaving the section M in the sheet and affixing the stamp overlapping the upper edges of the section F and the flap. I reserve the right to make such changes as fairly fall within the spirit and scope of the invention.

In practice the sheet will be bound or otherwise fastened in the periodical and bear under the directions on its face a list of all the advertisers in the periodical, with such additional information relating to their business as may be desired, and I also prefer to have on the face of the sheet a section H, in which the name and address of the inquirer will be written. A person looking over the advertisements and desiring to secure circulars relating to a certain subject, such as sporting goods or photographic apparatus, will turn to this sheet, tear it out of the book on the line B B, and check off the names of those who advertise the articles he is interested in, after which he will write his name and address in the section H. The inquirer, who thus indirectly becomes a correspondent with each of these advertisers, will then fold the sheet up on the line C C, then on the line D D, and finally on the line E E, tucking the flap under the address-section, which appears uppermost, and affixing the stamp in the manner described. If the section I is removed, the sheet is folded in the same manner and the single flap formed by the section L is tucked under the section F. The mailing-sheet will then be mailed and delivered in accordance with the printed address, which I contemplate will be at the office of the publisher of the magazine from which the sheet was removed, or to some other place where the business will be attended to, and the advertisers whose names are checked will be notified by the recipient of the sheet that the inquirer who sent the sheet desires circulars and price-lists and other information for general distribution which relate to the articles advertised in the magazine from which the sheet was taken. This gives the advertiser an opportunity for correctly crediting the magazine with the business secured through his advertisement therein, and it also places in the possession of the publisher indisputable evidence of the actual number of inquiries resulting from the advertising, the mailing-sheet constituting an absolute record in his hands which can be preserved for future reference.

The casual reader of the advertisements in a magazine will be attracted by the simplicity of this method of securing information from a number of advertisers, and as he can in this way communicate with a number of advertisers by one letter without a direct communication to each advertiser he will be more apt to increase his requests for circulars and extend them over a broader field, thereby increasing the value of the advertisement to the advertiser and the publisher and bringing to the inquirer information which may result to the mutual benefit of himself and the advertiser.

The lines of folds may be indicated in any way desired, and the line B B and E J E E, as well as the lines forming section M, may be made by perforations which will facilitate the removal of the sheet from the periodical and the sections I M from the sheet. Instead of using the stamp as a sealing device I may provide a slit, as indicated by the broken line P Q in Fig. 4, and cut away the corner of the flap on the lines R S, so that the flap may be inserted in said slit. The line E E may be shown on the face of the sheet or on the back thereof, or it may be omitted entirely, and the line D D may extend from top to bottom of the sheet or only half-way, as desired.

Having thus fully described my invention, what I claim, and desire to secure by Letters Patent, is—

1. A combined request and mailing sheet, comprising a rectangular sheet having on one side thereof a designated space for a list of names and a designated space for a written address, a printed address on the other side of the sheet in a corner section thereof bounded by adjacent side edges of the sheet and adjacent lines of folding and constituting the face of the envelop when the sheet is folded and directions on the sheet for folding the sheet twice on transverse lines to leave a flap-section and then tucking said flap-section in between the folds of the opposite section, substantially as described.

2. A combined request and mailing sheet, comprising a rectangular sheet having a designated space for a list of names, a space for a written address, a printed-address section which constitutes the face of the envelop when the sheet is folded, a designated section opposite the printed-address section to be cut out to leave a flap-section, and directions for folding the sheet twice on transverse lines and then tucking the flap-section under, substantially as described.

3. A combined request and mailing sheet, comprising a rectangular sheet having a designated space for a list of names, a space for a written address, a printed-address section which constitutes the face of the envelop when the sheet is folded, a designated section in said printed-address section to be cut out, a designated section opposite the printed-address section to be cut out to leave a flap-section, and directions for folding the sheet twice on transverse lines and then tucking the flap-section under that part of the address-section which contains the cut-out section and applying a sealing device around the edges of the section cut out of the address-section and on that part of the flap-section exposed by said cut-out section, substantially as described.

Signed by me at Chicago, Illinois, this 12th day of March, 1900.

DAVID L. TAYLOR.

Witnesses:
WM. O. BELT,
ADDIE C. EMMONS.